H. M. REYNOLDS.
LATHE DOG.
APPLICATION FILED MAY 8, 1913.
1,124,172.
Patented Jan. 5, 1915.
FIG. 1.
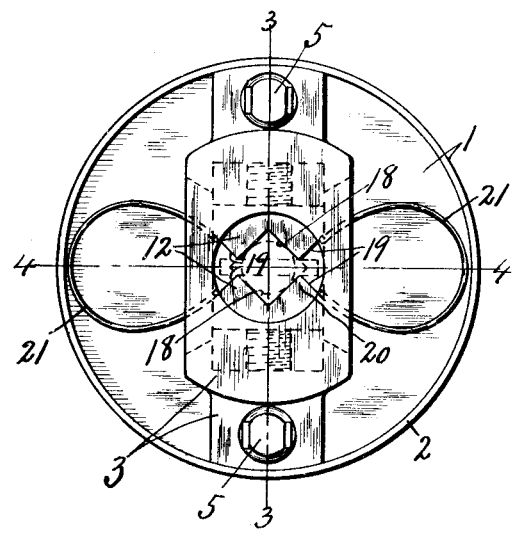
FIG. 3.
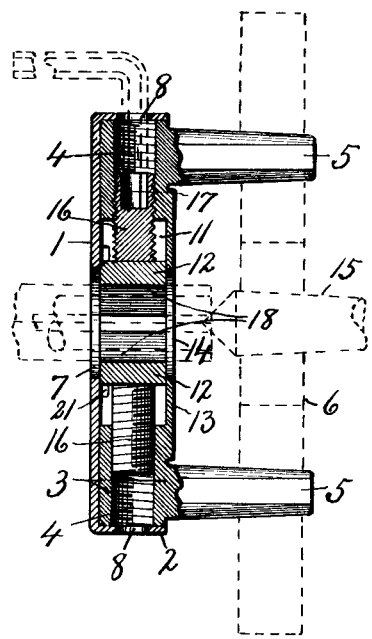
FIG. 2.
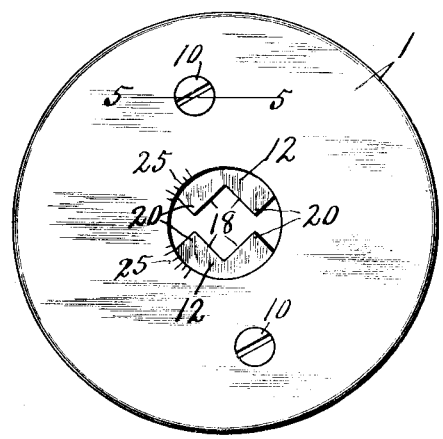
FIG. 4.
FIG. 5.
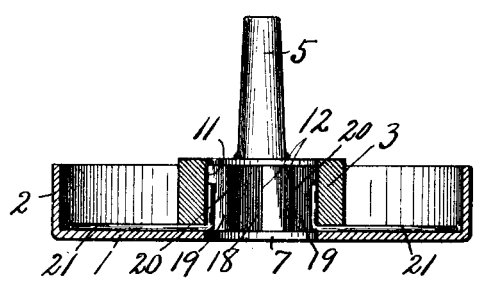
WITNESSES:
H. V. Hurst,
H. E. Chace
INVENTOR.
H. M. Reynolds,
BY
Howard P. Denison
ATTORNEY.

UNITED STATES PATENT OFFICE.

HERMAN M. REYNOLDS, OF ONEIDA, NEW YORK.

LATHE-DOG.

1,124,172. Specification of Letters Patent. Patented Jan. 5, 1915.

Application filed May 8, 1913. Serial No. 766,381.

*To all whom it may concern:*

Be it known that I, HERMAN M. REYNOLDS, of Oneida, in the county of Madison, in the State of New York, have invented new and useful Improvements in Lathe - Dogs, of which the following, taken in connection with the accompanying drawings, is a full, clear, and exact description.

This invention relates to certain improvements in lathe-dogs of the cylindrical disk type to guard against accidents incidental to the use of the ordinary lathe dog and similar devices having radial projections which are more or less liable to catch the sleeves and other parts of the operator's wearing apparel. These devices are generally provided with one or more axially extending lugs for interlocking engagement with the face plate or head of the lathe and are also provided with gripping devices for centering, holding and rotating the work with the dog as the latter is rotated by the face plate or lathe head.

The main object, therefore, of my invention is not only to increase the safety factor of this class of devices by avoiding the use of any radial projections beyond the cylindrical guard flanges but also to reduce the size and number of parts by making the lug or lugs sufficiently long to permit the application of the dog directly to the face plate and still allow for a limited axial adjustment.

Another object is to hold the jaws in operative position for radial adjustment between two telescoping or separable parts normally secured together by suitable fastening screws and to mount the jaws and adjusting screws wholly upon one of said parts so as to reduce the cost of manufacture and facilitate the work of assembling.

Another object is to provide the other telescoping part with a marginal guard flange having radial apertures registering with the radially threaded openings for the jaw-adjusting screws but of less diameter than said openings so as to prevent any possibility of the screws working loose and extending beyond the periphery of the guard flange or disk, the openings in the guard flange being for the purpose of receiving a socket wrench or similar tool by which the jaw-adjusting screws may be turned for tightening and loosening the jaws upon and from the work.

Other objects and uses relating to specific parts of the device will be brought out in the following description.

In the drawings—Figures 1 and 2 are opposite face views of a lathe dog embodying the various features of my invention. Figs. 3, 4 and 5 are sectional views of the same lathe dog taken respectively on lines 3—3 and 4—4, Fig. 1, and 5—5, Fig. 2.

As illustrated this lathe dog comprises a cup-shape disk —1— of sheet metal stamped the desired form and provided with an axially extending marginal guard flange —2— within which is telescopically fitted a jaw-retaining cap or block —3— having radially threaded apertures and one or more, in this instance two, axially extending tapering lugs —5— of sufficient length to enter the usual openings of an ordinary face plate or lathe head —6— shown by dotted lines in Fig. 3.

The disk —1— is provided with a central circular opening —7— to receive any work, shown by dotted lines in Fig. 3, within the sides of the said opening.

The marginal flange —2— is preferably disposed at substantially right angles to the main body or back of the disk and is of sufficient axial length to entirely cover and conceal the jaw-retaining block —3— exclusive of its lugs —5— and is provided with diametrically opposite radial apertures —8— of less diameter than the threaded openings —4— for receiving a wrench or equivalent tool —9—, also shown by dotted lines in Fig. 3, whereby the jaws presently described may be tightened or loosened upon and from the work.

The object in making the apertures —8— of less diameter than the threaded openings —4— is to prevent the screws from backing up through the periphery of the guard flange, thereby preventing any possibility of the jaw-adjusting screws from projecting beyond the guard flange and thus further reducing the liability of injury to the operator.

The jaw-retaining cap —3— is relatively narrow in width as compared with the diameter of the disk and is arranged diametrically in the open side thereof wholly within the marginal flange —2— so as to bear against the back of the disk —1— with its diametrically opposite radial screw openings —4— registered with the corresponding apertures —8— in which position the disk and jaw retaining plate or block are held in fixed relation by screws —10— or equivalent fastening means.

This block —3— is also provided with a diametrically elongated rectangular recess —11— extending inwardly from its face adjacent the disk —1— for receiving a pair of opposed radial movable jaws —12—, the axial depth of the recess —11— being substantially equal to that of the jaws leaving a relatively thin guide web —13— across the inner side of the recess which together with the disk —1— serve to retain the jaws in operative position against axial displacement.

The web —13— is preferably integral with the block —3— and provided with a central circular opening —14— for receiving the work or, if necessary, the adjacent end of a centering pin —15— (shown by dotted lines in Fig. 3) as passing through the face plate or lathe head —6—.

The jaws —12— may be tightened and loosened upon and from the work by radial adjusting screws —16— in the threaded openings —4—, each screw having its outer end provided with a socket —17— of angular cross section for receiving the correspondingly formed inner end of the socket wrench —9—, the inner ends of said screws being substantially flat for engagement with the adjacent faces of the jaws —12—.

The width of the recesses —11— in which the jaws are located is equal to or slightly greater than the diameter of the openings —7— and —14— and extends equi-distant to opposite sides of the axis thereof while the length of the recess is considerably greater than the diameter of said openings —7— and —14— sufficient to permit the meeting faces of the jaws to be moved beyond said openings.

The jaws —12— are identical in construction and interchangeable and of substantially the same axial depth and radial width as the recess —11— in which they are movable, leaving just sufficient clearance to permit the jaws to be adjusted radially without excessive friction. The meeting faces of these jaws are provided with axially extending V-shape grooves —18— rectangular in cross section and having their apex in the same diametrical plane, thereby enabling the jaws to grip square, cylindrical or polygonous sided objects with equal centering precision. The opposite edges of these gripping faces are also beveled at —19—, thereby forming symmetrical V-shaped ribs —20— equidistant from and at opposite sides of the axis of the disk, thus adapting the jaws for holding flat work as indicated by dotted lines in Fig. 2.

The jaws are normally under spring tension by opposite loop-springs —21— lying flatwise against the inner face of the back of the disk —1— and having their ends offset laterally within the recess —11— and engaged with the meeting faces of the jaws when their outer edges are at the base of the beveled portions —19— so as to exert a constant outward pressure upon the jaws for opening the same when released by the unscrewing of the screws —16—.

In clamping the jaws open or releasing them from the work, each jaw is preferably operated separately by means of the wrench —9— but the positions of the jaws relatively to the axis of the disks may be determined by graduations —25— on the front of the disk as shown in Fig. 2.

What I claim is:

1. A lathe-dog comprising a disk having an axially extending marginal flange, a jaw-retaining cap fitted within the flange and against the back of the disk, said cap being provided with a recess in its side adjacent the back of the disk, jaws movable radially in the recess, adjusting screws for the jaws, and means on the cap for interlocking engagement with a lathe head or face plate.

2. A lathe-dog comprising a cylindrical disk having an axially extending marginal flange, a jaw-retaining cap fitted within the marginal flange and provided with a central radially elongated recess and opposite radially threaded apertures alined with said recess, said cap having axially extending lugs for interlocking engagement with a lathe head or face plate, jaws movable in said recess and adjusting screws in said threaded openings for tightening the jaws upon the work.

3. A lathe-dog comprising telescoping members and means for securing them together, one of the members having a circular flange surrounding the other member, the inner member having diametrically opposite screw openings and jaw-adjusting screws therein, a pair of jaws held in place between said members, said flange having diametrically opposite radial openings registering with the threaded openings but of less diameter than the screws to prevent the screws from projecting beyond the periphery of the flange.

4. A lathe-dog comprising telescoping members having diametrically opposite registering openings, radially movable jaws between said members, adjusting screws movable in the openings in the inner member for tightening the jaws upon the work, the openings in the outer member being of less size than the diameter of the screws, and springs for forcing the jaws apart when released by the screws.

In witness whereof I have hereunto set my hand this 6th day of May, 1913.

HERMAN M. REYNOLDS.

Witnesses:
 E. A. THOMPSON,
 EVA E. GREENLEAF.